US012104526B2

(12) United States Patent
Riquet

(10) Patent No.: US 12,104,526 B2
(45) Date of Patent: Oct. 1, 2024

(54) AIRCRAFT PART ANTI-ICING TREATMENT METHOD

(71) Applicant: Safran Nacelles, Gonfreville l'Orcher (FR)

(72) Inventor: Audrey Riquet, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 409 days.

(21) Appl. No.: 17/166,826

(22) Filed: Feb. 3, 2021

(65) Prior Publication Data

US 2021/0156305 A1    May 27, 2021

Related U.S. Application Data

(63) Continuation of application No. PCT/EP2019/070780, filed on Aug. 1, 2019.

(30) Foreign Application Priority Data

Aug. 3, 2018 (FR) ..................... 18/57304

(51) Int. Cl.
*F02C 7/047* (2006.01)
*B23K 26/00* (2014.01)
(Continued)

(52) U.S. Cl.
CPC .......... *F02C 7/047* (2013.01); *B23K 26/0006* (2013.01); *B23K 26/0624* (2015.10); *B23K 26/355* (2018.08); *B23K 26/3584* (2018.08); *B29C 59/16* (2013.01); *B64D 15/04* (2013.01); *B64D 33/02* (2013.01); *B23K 2103/16* (2018.08); *B29C 59/165* (2013.01); *B64D 29/00* (2013.01); *B64D 2033/0233* (2013.01); *F05D 2300/512* (2013.01); *Y02T 50/60* (2013.01)

(58) Field of Classification Search
CPC . F02C 7/047; B23K 26/0006; B23K 26/0624; B23K 26/355; B23K 26/3584; B23K 2103/16; B29C 59/16; B29C 59/165; B64D 15/04; B64D 33/02; B64D 29/00; B64D 2033/0233; F05D 2300/512; Y02T 50/60
See application file for complete search history.

(56) References Cited

U.S. PATENT DOCUMENTS

| 2009/0272095 A1* | 11/2009 | Rainous | ................. B64D 15/00 60/39.093 |
| 2009/0314899 A1* | 12/2009 | Porte | ...................... F02C 7/047 244/53 B |

(Continued)

FOREIGN PATENT DOCUMENTS

FR    3013241    5/2015

OTHER PUBLICATIONS

International Search Report for International Application PCT/EP2019/070780, mailed Oct. 17, 2019.

*Primary Examiner* — Phutthiwat Wongwian
*Assistant Examiner* — Susan E Scharpf
(74) *Attorney, Agent, or Firm* — Burris Law, PLLC

(57) ABSTRACT

A method for the anti-icing treatment of a surface of an aircraft part made of an organic matrix composites includes a texturing step in which the surface is irradiated with femtosecond laser pulses so as to render the surface superhydrophobic.

17 Claims, 1 Drawing Sheet

(51) Int. Cl.
  *B23K 26/0622* (2014.01)
  *B23K 26/352* (2014.01)
  *B23K 103/16* (2006.01)
  *B29C 59/16* (2006.01)
  *B64D 15/04* (2006.01)
  *B64D 29/00* (2006.01)
  *B64D 33/02* (2006.01)

(56) References Cited

U.S. PATENT DOCUMENTS

| | | | |
|---|---|---|---|
| 2011/0151186 A1* | 6/2011 | Lambourne | C08G 77/385 |
| | | | 427/532 |
| 2011/0167781 A1* | 7/2011 | Maheshwari | B64D 15/12 |
| | | | 977/902 |
| 2015/0129720 A1* | 5/2015 | Strobl | B64D 15/12 |
| | | | 244/134 F |
| 2015/0136226 A1* | 5/2015 | Guo | B23K 26/0006 |
| | | | 428/141 |
| 2015/0299503 A1* | 10/2015 | Carter | B05D 7/54 |
| | | | 427/407.1 |
| 2016/0023771 A1* | 1/2016 | Riquet | B64D 33/02 |
| | | | 244/134 E |
| 2016/0153287 A1* | 6/2016 | Roach | F01D 25/005 |
| | | | 464/181 |
| 2016/0160681 A1* | 6/2016 | Roach | C23C 18/1641 |
| | | | 427/443.1 |
| 2017/0002475 A1* | 1/2017 | Strobl | B64D 15/16 |
| | | | 244/53 B |
| 2017/0240985 A1* | 8/2017 | Srinivasan | F01D 25/32 |

\* cited by examiner

AIRCRAFT PART ANTI-ICING TREATMENT METHOD

CROSS-REFERENCE TO RELATED APPLICATIONS

This application is a continuation of International Application No. PCT/EP2019/070780, filed on Aug. 1, 2019, which claims priority to and the benefit of FR 18/57304, filed on Aug. 3, 2018. The disclosures of the above applications are incorporated herein by reference.

FIELD

The present disclosure relates to the anti-icing treatment of aircraft parts, in particular of parts made of organic matrix composites of an aircraft propulsion unit nacelle.

BACKGROUND

The statements in this section merely provide background information related to the present disclosure and may not constitute prior art.

During the flight phase, an aircraft is subjected to climatic conditions which may cause the formation of frost on parts forming leading edges and/or trailing edges, in particular on the air inlet lip of a nacelle.

Such a frost formation can cause changes in the aerodynamic profile of the nacelle and damage the engine in the case of tearing-off of ice blocks formed on the lip.

In order to inhibit the freezing of water droplets on the lip and the formation of ice blocks, hot air taken, for example from the engine, may be circulated through the lip.

The water droplets, thus warmed, run off on the lip until contacting parts located downstream of the lip. Since these parts are not coupled to the de-icing or anti-icing system, droplets can freeze on these parts when they run off.

SUMMARY

This section provides a general summary of the disclosure and is not a comprehensive disclosure of its full scope or all of its features.

The present disclosure provides for inhibiting icing runoff, in particular on the parts made of organic matrix composites located downstream of the air inlet lip.

More generally, the present disclosure provides for inhibiting the formation of frost on aircraft parts despite the presence of non-evaporated water on these parts.

To this end, the present disclosure relates to a method for treating a surface of an aircraft part made of organic matrix composites, this method comprising a texturing step in which the surface is irradiated by femtosecond laser pulses so as to make this surface superhydrophobic.

A superhydrophobic surface inhibits the adhesion of water droplets and allows inhibiting the formation of frost on a part thus treated.

This method allows treating the surface of any part without altering the functionality thereof. For example, when the part comprises an acoustic panel, the surface texturing has no impact on the acoustic treatment carried out by the panel.

In addition, such a surface treatment is compatible with protecting the part against ultraviolet radiation, using an anti-ultraviolet paint, and/or protecting the part using organic paints.

In one form, the texturing step may be preceded by a step of protecting the surface by applying an organic paint. By way of non-limiting examples, this paint may comprise an epoxy base or a polyurethane base.

The laser pulses may have a duration of less than 900 femtoseconds. In one form, the laser pulses have a duration of less than 600 femtoseconds.

According to one form of the present disclosure, it also relates to a part made of organic matrix composites of an aircraft, this part comprising a surface treated with a method as described above.

In one form, the part may comprise a surface provided with micro-craters and periodically spaced lashes.

The micro-craters may have a diameter less than 1 mm and a depth less than 10 µm. In one form, the micro-craters have a diameter between 1 µm and 100 µm. In another form, the micro-craters have a depth between 600 nm and 1 µm.

The lashes may have a dimension less than 1 µm. In one form of the present disclosure, the lashes have a dimension between 1 nm and 800 nm.

This part made of organic matrix composites may constitute all or part of an air inlet section of the aircraft, and said surface may be a surface of a leading edge and/or a trailing edge of this air inlet section.

According to another form, the present disclosure further concerns an aircraft propulsion unit comprising such a part made of organic matrix composites.

According to yet another form, the present disclosure finally concerns an aircraft comprising such a propulsion unit and/or a part made of organic matrix composites as defined above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
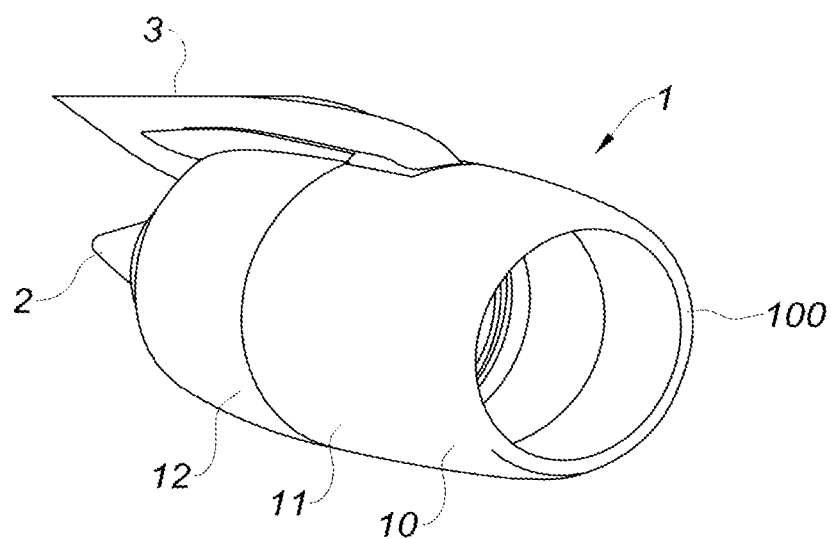
FIG. 1 is a schematic view of an aircraft propulsion unit provided with a nacelle and an engine to which the teachings of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates an aircraft propulsion unit comprising a nacelle 1 supporting an engine 2 of the turbojet engine type. The nacelle 1 is suspended from a pylon 3 connected to a wing (not shown) of the aircraft (not shown).

This nacelle 1 comprises an air inlet section 10, a middle section 11, and a downstream section 12 which may provide for thrust reversal.

Figure 2:
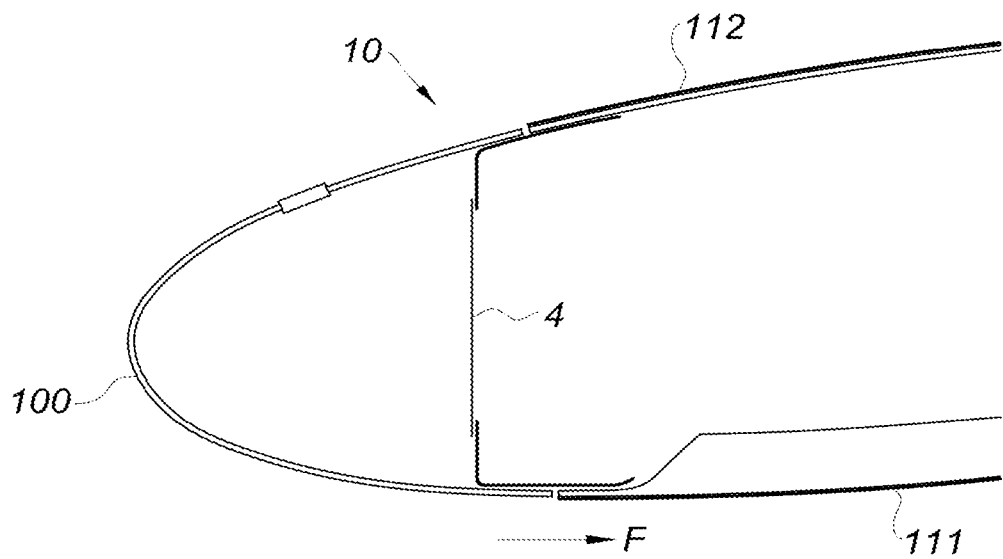
FIG. 2 is a longitudinal sectional view of an air inlet section of the nacelle of the propulsion unit of FIG. 1.

With reference to FIG. 2, the air inlet section 10 comprises a lip 100 forming a leading edge and, in the extension of the lip 100, a section including an inner wall 111 and an outer wall 112 forming respective trailing edges. The outer wall 112 is radially away from the inner wall 111. The inner wall 111 is in contact with a cold air flow F passing through the nacelle 1.

In this example, the inner 111 and outer 112 walls are made of organic matrix composites.

In this example, the lip 100 delimits, with an inner partition 4, an annular inner space capable of receiving an anti-icing treatment device (not shown). This device may be a pneumatic or electrical de-icing or anti-icing device.

In a non-limiting example of implementation of the present disclosure, a surface of the inner wall 111 of the air inlet section 10 is made superhydrophobic by irradiation with femtosecond laser pulses. The laser pulses may have a duration of less than 900 femtoseconds. In one form, the laser pulses have a duration of less than 600 femtoseconds.

The hydrophobic characterization of a material is done by measuring the contact angle between the flat surface thereof and a drop of water placed on the surface thereof. The standard materials have an angle of less than 90°, the hydrophobic materials have an angle between 90° and 150°, and the superhydrophobic materials have an angle greater than 150°.

The femtosecond laser irradiation is a surface texturing step which may give rise to micro-craters 50 and lashes 60.

Figure 3:
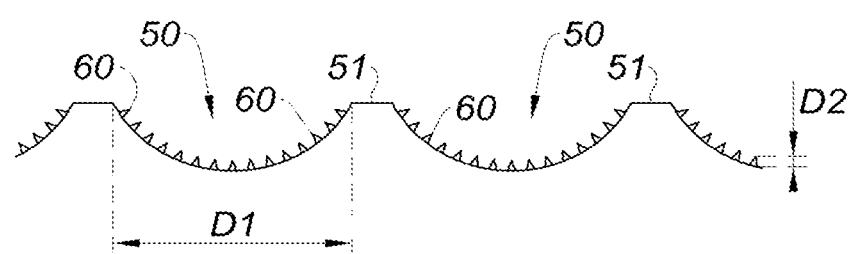
FIG. 3 is a schematic view of a portion of a surface textured using the method according to the present disclosure.

As illustrated in FIG. 3, the micro-craters 50 are separated by flattened tops 51 and the lashes 60 are periodically spaced in the micro-craters 50.

In forms which are not shown, the textured surface may comprise lashes in the micro-craters and on the tops, or only at the tops.

The superhydrophobic properties of the present disclosure may be obtained by the following:

micro-craters 50 having a diameter D1 less than 1 mm and a depth less than 10 µm. In one form, the micro-craters 50 have a diameter between 1 µm and 100 µm. In one form, the micro-craters 50 have a depth between 600 nm and 1 µm, and lashes having a dimension D2 less than 1 µm. In one form of the present disclosure, the lashes have a dimension D2 between 1 nm and 800 nm.

Such a treatment method may also be implemented to texturize the outer surface 112 of the air inlet section 10, which allows making the nacelle 1 compatible with an "open rotor" type turbojet engine, that is to say having an unducted fan at the downstream section thereof.

The lip 100 of the air inlet section 10 may also be made superhydrophobic using the method of the present disclosure. The superhydrophobic character of the air inlet lip advantageously allows using a piezoelectric component de-icing device. The piezoelectric component de-icing comprises vibrating the surface to be de-iced in order to break and remove the weak layers of ice accumulated on the lip. Thus, the use of a superhydrophobic surface in addition to a piezoelectric type mechanical de-icing device allows facilitating the unhooking of the ice, in that the adhesive force of the ice on the wall of the element to be de-iced is reduced.

The present disclosure is not limited to the examples which have been described herein and many adjustments may be made to these examples without departing from the scope of the present disclosure. For example, the method according to the present disclosure may be implemented for texturing other aircraft parts such as a wing, an empennage, or any other portion of a nacelle or of the aircraft requiring a treatment against the accretion of frost, and more particularly any part comprising a surface constituting a trailing or leading edge.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for treating a surface of an aircraft part made of organic matrix composites and for assembling said aircraft part, the method comprising:
    a texturing step in which the surface is irradiated by femtosecond laser pulses so as to make the surface superhydrophobic; and
    assembling a piezoelectric component with said aircraft part, the piezoelectric component forming a mechanical de-icing device being configured to generate vibration to break ice accumulated on the surface of the aircraft part.

2. The method according to claim 1, wherein the pulses have a duration of less than 900 femtoseconds.

3. The method according to claim 1, wherein the pulses have a duration of less than 600 femtoseconds.

4. The method according to claim 1, wherein the texturing step is preceded by a step of protecting the surface by applying an organic paint.

5. The method according to claim 4, wherein the paint comprises an epoxy base or a polyurethane base.

6. An assembly of the piezoelectric component and the aircraft part according to claim 1, the aircraft part being made of organic matrix composites.

7. The assembly according to claim 6, wherein the surface of the aircraft part made of organic matrix composites is provided with:
    micro-craters having a diameter less than 1 mm and a depth less than 10 µm, and
    lashes having a dimension less than 1 µm, the lashes being periodically spaced.

8. The assembly according to claim 7, wherein the micro-craters of the aircraft part made of organic matrix composites have a diameter between 1 µm and 100 µm.

9. The assembly according to claim 7, wherein the micro-craters of the aircraft part made of organic matrix composites have a depth between 600 nm and 1 µm.

10. The assembly according to claim 7, wherein the lashes of the aircraft part made of organic matrix composites have a dimension between 1 nm and 800 nm, the lashes being periodically spaced.

11. The assembly according to claim 6, the aircraft part made of organic matrix composites being an air inlet section of the aircraft, said surface being a surface of a leading edge and/or a trailing edge of the air inlet section.

12. An aircraft propulsion unit comprising the assembly according to claim 6.

13. An aircraft comprising the propulsion unit according to claim 12.

14. An aircraft comprising the assembly according to claim 6.

15. The method according to claim 1, wherein the texturing step causes the surface to form a plurality of micro-craters.

16. The method according to claim 15, wherein the piezoelectric component is configured to break the ice accumulated on micro-crater surfaces of the plurality of micro-craters.

17. An aircraft propulsion unit comprising:
an air inlet section comprising an air inlet lip made of organic matrix composites, the air inlet lip having a surface treated with a method comprising a texturing step in which the surface is irradiated by femtosecond laser pulses so as to make the surface superhydrophobic; and
a piezoelectric component forming a mechanical de-icing device configured to generate vibration to break ice accumulated on vibrate the surface of the air inlet lip.

* * * * *